Oct. 3, 1950 W. J. STRONG 2,524,489
APPARATUS FOR TRIMMING PROTUBERANCES FROM TIRES
Filed April 23, 1948 3 Sheets-Sheet 1

Inventor
Walter J. Strong
By
Atty

Oct. 3, 1950      W. J. STRONG      2,524,489
APPARATUS FOR TRIMMING PROTUBERANCES FROM TIRES
Filed April 23, 1948      3 Sheets-Sheet 2
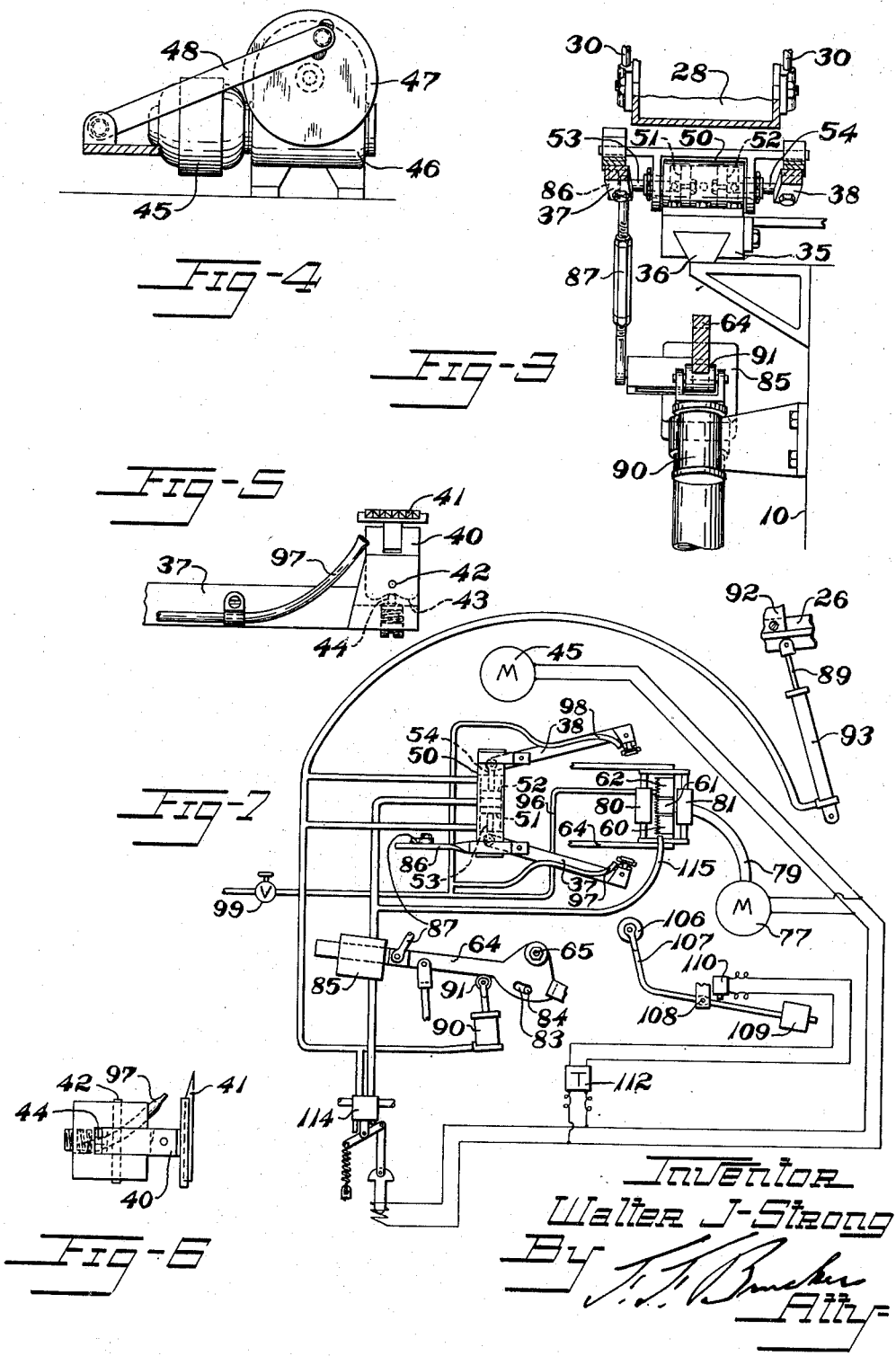
Inventor
Walter J. Strong Oct. 3, 1950 W. J. STRONG 2,524,489
APPARATUS FOR TRIMMING PROTUBERANCES FROM TIRES
Filed April 23, 1948 3 Sheets-Sheet 3

Inventor
Walter J. Strong
By T. T. Brucker
Atty.

Patented Oct. 3, 1950

2,524,489

UNITED STATES PATENT OFFICE 2,524,489

APPARATUS FOR TRIMMING PROTUBERANCES FROM TIRES

Walter J. Strong, Cuyahoga Falls, Ohio, assignor to The B. F. Goodrich Company, New York, N. Y., a corporation of New York Application April 23, 1948, Serial No. 22,925

10 Claims. (Cl. 164—39)

This invention relates to apparatus for trimming undesirable protuberances from molded tire articles and is especially useful in trimming tire casings of large cross section, although features of the invention are also useful in the trimming of protuberances from other tire articles.

In the molding of annular tire casings it has been customary to provide drilled vent holes in the molds to permit entrapped air to escape and provide complete filling of the molds. In the molding operation, the rubber-like material of the tread and side walls of the tire has flowed into the vent holes leaving undesirable protuberances on the molded tire which must be trimmed therefrom with considerable expenditure of time and effort. The problem is aggravated in tires of great cross-sectional dimensions and a great number of vent holes widely distributed over the tire surface resulting in a greater distribution of the undesirable protuberances over the tire surface.

It is an object of the present invention to simultaneously and progressively trim protuberances from the tread and side walls of a tire casing.

Other objects are to provide for accommodating articles of different sizes, to automatically advance the trimming mechanism into contact with the article upon arrival of the article at the trimming station, to provide an oscillating movement of the trimming mechanism about the surface of the article, and to provide for lubricating the cutting mechanism.

These and other objects will appear from the following description and the accompanying drawings.

Of the drawings:

Fig. 3 is a sectional view, taken on line 3—3 of Fig. 1.

Fig. 4 is a sectional view, taken on line 4—4 of Fig. 2.

Fig. 5 is a detail face view of one of the side trimming members.

Fig. 6 is an end view thereof.

Fig. 7 is a piping and wiring diagram of the apparatus.

Figure 1:
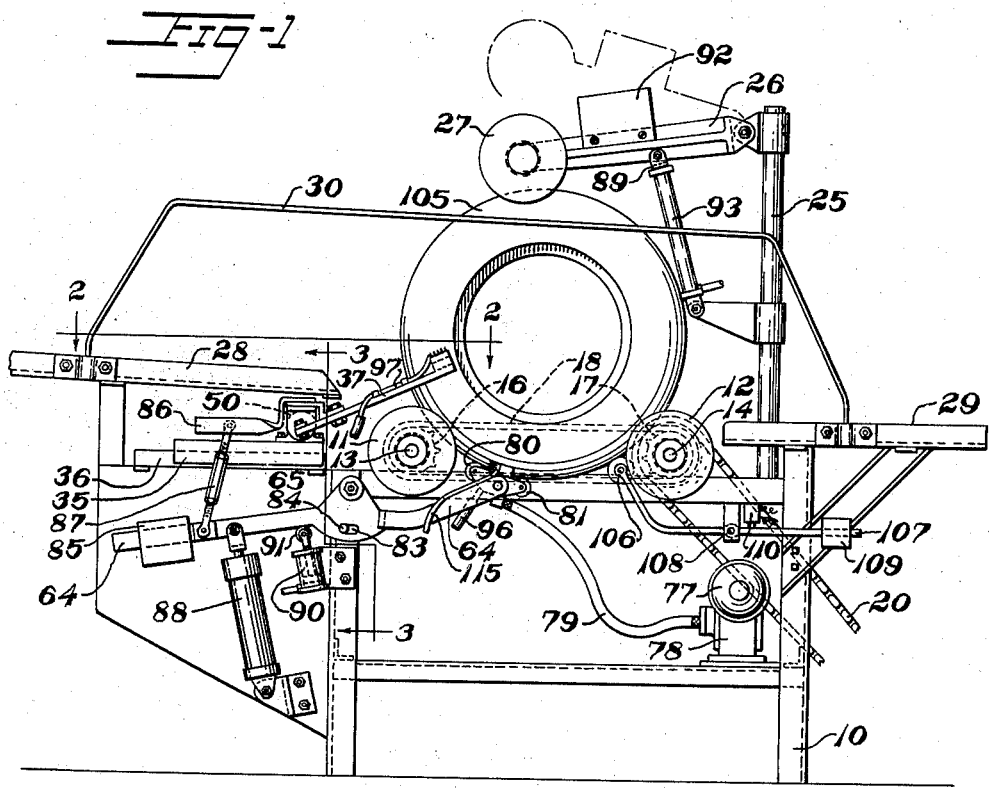
Fig. 1 is a side elevation of apparatus constructed in accordance with and embodying the invention, parts being broken away, a tire being shown therein.
Figure 2:
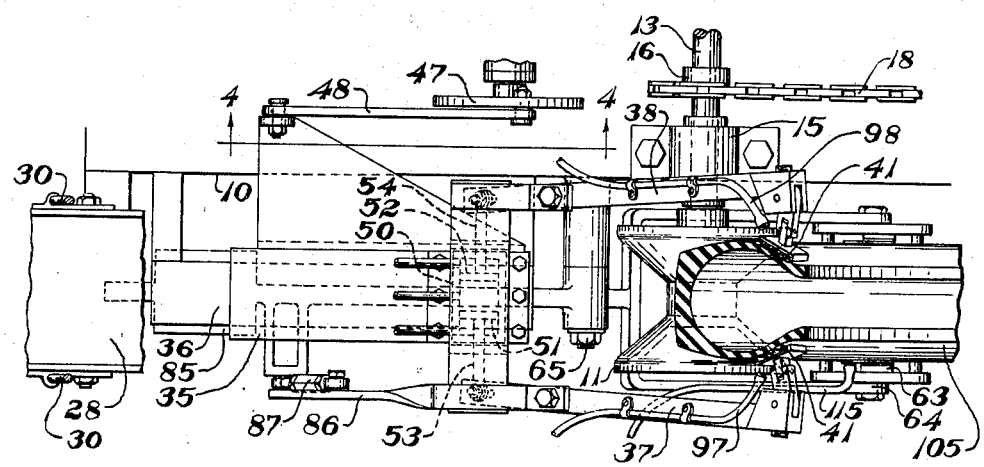
Fig. 2 is a sectional view taken on line 2—2 of Fig. 1, parts being broken away.

Referring to the drawings, the numeral 10 designates a frame which supports a pair of grooved rotatable cradle rollers 11, 12 for rotating a tire casing or similar article about a horizontal axis. The rollers are secured to rotatable parallel shafts 13, 14 journaled on the frame 10 as at 15. Sprockets 16, 17 are fixed to the shafts and are connected by a drive chain 18. Shaft 14 is constantly driven from a motor (not shown) by a chain 20. A standard 25 is fixed to the frame and pivotally supports an arm 26 which rotatably supports a third grooved roller 27 for centering the top of the tire.

A channeled inclined runway 28 leads into the apparatus for rolling tires therealong and a similar runway 29 extends from the apparatus. Guard rails 30 extend along each side of the runways to support the tires by their sides.

For trimming the protuberances along the side walls of the tire as it is supported and rotated by the cradle rollers, a carriage 35 is mounted for sliding movement along a rail 36 secured to the frame 10. A pair of arms 37, 38 are pivotally mounted on a cylinder 50, hereinafter described and mounted on carriage 35, to swing toward and from the side walls of the tire. Each arm pivotally supports a knife-holding bracket 40 on which a knife 41 is secured. The knife-holding brackets are mounted on vertical pivots 42 and have cam surfaces 43 frictionally engaged by spring pressed plungers 44 which normally hold the brackets in mid-position but permit movement about the vertical pivots to accommodate the surface of the tire against which the knives take a tangential position (see Fig. 5). An electric motor 45 (see Fig. 4) drives a speed reducer 46 having a crank disc 47 connected by a pitman 48 to carriage 35. The arrangement is such that the knives are oscillated radially of the tire side walls by motor 45.

For holding the knives against the tire side walls, the fluid pressure operated cylinder 50, previously mentioned, is rotatably mounted for movement about a horizontal axis on carriage 35 and has a pair of pistons 51, 52 connected respectively to piston rods 53, 54 which in turn are pivotally connected respectively to arms 37, 38. The cylinder has a center port and end ports so that fluid entering the central port will move both pistons outwardly, thereby moving the knives toward the side walls of the tire, and fluid pressure at the end ports will move the knives away from the tire.

Figure 9:
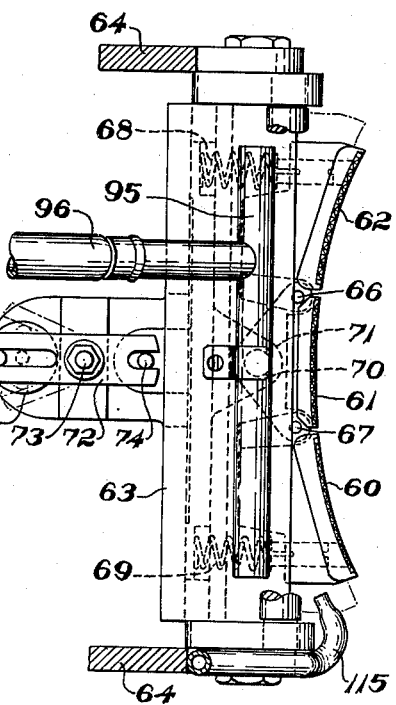
Fig. 9 is an end view thereof.
Figure 10:
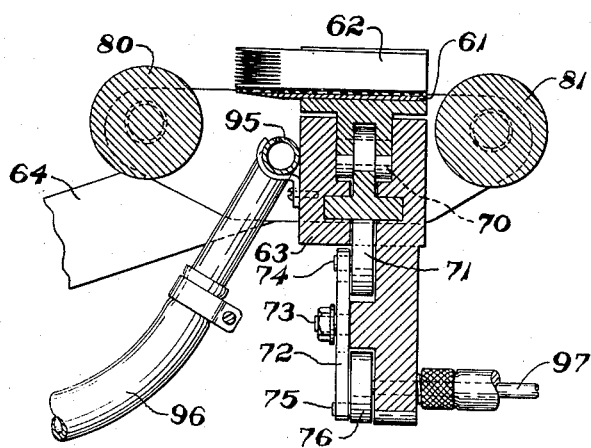
Fig. 10 is a cross sectional view thereof taken on line 10—10 of Fig. 8.

A series of articulated knives 60, 61, 62 are supported below the tire in a position to contact the tread thereof by a support 63 mounted on a fixed arm 64 (see Figs. 8 to 10). The arm is pivotally supported, as at 65 on the frame 10. The knives are mounted to slide laterally of the support 63 and are flexibly connected as by pivots 66, 67. The end knives are pressed toward the tire by coil springs 68, 69. The center knife 61 is pivotally mounted, as at 70 to a carriage 71. A lever 72 is pivotally mounted on the support 63, as at 73 and has a forked end engaging about a pin 74 on the carriage 71. The opposite end of the lever 72 is forked to receive a crank pin 75 on a crank disc 76. The arrangement is such that rotation of the crank disc 76 causes the knives to oscillate across the tire tread. A motor 77 is provided, mounted on the frame 10, and through a speed reducer 78 drives a flexible shaft 79 which in turn drives the disc 76 to oscillate the knives.

A pair of free-running rollers 80, 81 are mounted on the support 63 to the forward and rear of the knives, and are adapted to engage the tire and limit approach of the knives thereto. Movement of the arm 64 is also limited by a slot 83 therein engaging over a stop pin 84 on frame 10.

A counter-weight 85 on the outer end of arm 64 holds the knives 60, 61, 62 normally in a raised position. An arm 86 is attached to cylinder 50 for rotating the cylinder about its axis and with it the arms 37, 38 and their supported knives. A pitman 87, adjustable as to length, pivotally connects arm 86 to arm 64 so that movement of one arm moves the other accordingly. An oleo strut or oil check device 88 is pivotally connected to the frame 10 and the arm 64 to prevent too rapid movement of the arm 64 and arm 86.

The arm 26 which supports the roller 27 is weighted as at 92 to hold it in a normally lowered position. For raising it, a pressure fluid operated cylinder 93 is pivotally mounted on the support 25 and its piston rod 89 is pivotally mounted on the arm 26. For raising the counterweighted end of arm 64 and thereby lowering the cutters 60, 61, 62, a pressure fluid operated cylinder 90 is mounted on frame 10 and its piston rod has a roller 91 which engages under the arm 64.

To lubricate the knives, and reduce friction in cutting the rubber-like material a spray pipe 95 is mounted on support 63 to deliver water to the work at the knives 60, 61, 62 and is connected to a water supply by a flexible hose 96. Spray tubes 97, 98 are also provided at knives 41 and are connected by flexible hose to the same source as hose 96 by way of a valve 99.

In the operation of the apparatus, with rollers 11, 12 rotating constantly, a tire 105 is rolled from the runway 28 onto the rollers 11, 12. At this position, the tire depresses a roller 106 mounted on a swinging arm 107 pivotally mounted on frame 10, as at 108. The roller is normally elevated by a counterweight 109, and when depressed closes a limit switch 110 which energizes a timer 112. The timer starts motors 77 and 45 which cause the trimming knives to oscillate and at the same time energizes a solenoid-operated four-way valve 114 (see Fig. 7). The valve is actuated to connect the central port of cylinder 50 to a source of compressed air causing arms 37, 38 to be moved toward the tire into trimming position and also supplies compressed air to a jet 115 at the tread cutting knives for cleaning the knives of cuttings collected thereupon. After the tire has made at least one revolution, the timer 112 reverses valve 114 to exhaust the central port of cylinder 50 and supply air under pressure to its end ports, separating arms 37, 38. At the same time, the valve supplies air to cylinder 90 to lower the tread trimming knives and also supplies air to cylinder 93 to lift roller 27 so that the tire may be removed. At the same time the central port of cylinder 50 is opened to exhaust.

Figure 8:
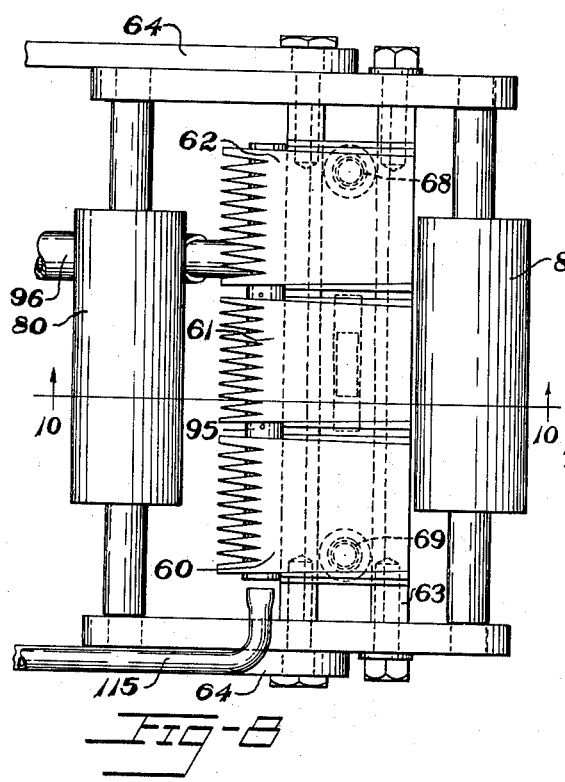
Fig. 8 is a plan view of the tread trimming member, parts being broken away.

The knives 60, 61, 62 and 41 are provided with toothed sharpened cutting edges, as shown in Fig. 8. The protuberances on the tire enter the spaces between the teeth of the knives and are sheared off by the oscillating movement as well as by advance of the tire toward the knives.

When a new tire is rolled into contact with a tire on the cradle rolls, the roller 27 being raised, the tire on the cradle rollers is lifted by its contact with the new tire and its contact with running roller 12 so that it is discharged onto the runway 29.

The pitman 87 is so adjusted to length that when the knives 60, 61, 62 are in trimming position, the knives 41 are adjusted to the proper place along the side wall of the tire to engage the protuberances thereon.

The invention has the advantage of automatically trimming protuberances from tires of large cross-section having a wide spread of protuberances thereover. Shearing of the protuberances clear of the tire is assured by the oscillating movement of the knives.

Variations may be made without departing from the scope of the invention as it is defined by the following claims.

I claim:

1. Apparatus for trimming protuberances from an annular article of rubber-like material, said apparatus comprising means for supporting and rotating the article about its axis, trimming knives adjustably mounted to conform to the contour of the periphery of articles, trimming knives moveable into and out of engagement with the side walls of the article, and means providing a simultaneous oscillating movement of all said knives crosswise of the direction of rotative movement of the article.

2. Apparatus for trimming protuberances from an annular article of rubber-like material, said apparatus comprising a pair of rotatable cradle rolls for supporting the article, a roller above said cradle rolls for maintaining contact of the article with said cradle rolls for contacting the periphery of the article, trimming means mounted for movement into and out of engagement with the side walls of the article, and means controlled by the presence of an article on said cradle rolls for moving the last said trimming means into engagement therewith.

3. Apparatus for trimming protuberances from an annular article of rubber-like material, said apparatus comprising a pair of rotatable cradle rolls for supporting the article, a roller above said cradle rolls for maintaining contact of the article with said cradle rolls, trimming means mounted between said cradle rolls for contacting the periphery of the article, trimming means mounted for movement into and out of engagement with the side walls of the article, means controlled by the presence of an article on said cradle rolls for moving the last said trimming means into engagement therewith, and means providing an oscillating movement of said trimming means with relation to the surface of the article.

4. Apparatus for trimming protuberances from an annular article of rubber-like material, said apparatus comprising a pair of rotatable cradle rolls for supporting the article, a roller above said cradle rolls for maintaining contact of the article with said cradle rolls, trimming means mounted between said cradle rolls for contacting the periphery of the article, trimming means mounted for movement into and out of engagement with the side walls of the article, means controlled by the presence of an article on said cradle rolls for moving the last said trimming means into engagement therewith, and means providing an oscillating movement of said trimming means with relation to the surface of the article, said trimming means comprising knives having toothed edges for shearing protuberances from the article.

5. Apparatus for trimming protuberances from an annular tire casing, said apparatus comprising a pair of grooved cradle rollers for supporting the tire and rotating it about its axis, tread trimming knives adustably conformable to the tread contour of the tire, side wall trimming knives moveable into and out of contact with the side walls of the tire, said tread and side wall trimming knives having means for oscillating them laterally of the tread and side walls of the tire, and means controlled by the presence of a tire on said cradle rollers for initiating such oscillating movement.

6. Apparatus for trimming protuberances from an annular tire casing as defined by claim 5 in which said knife comprises articulated knife sections and means resiliently conforming the sections to the tire surface during the oscillating movement.

7. Apparatus for trimming protuberances from an annular article, said apparatus comprising means for supporting and rotating the article about its axis, trimming means adjustably mounted to conform to the contour of the article laterally thereof, said trimming means comprising a central knife member and wing knife members articulated thereto, and means providing an oscillating movement of said trimming means relative to the surface of the article.

8. Apparatus for trimming protuberances from an annular article, said apparatus comprising means for supporting and rotating the article about its axis, trimming means adjustably mounted to conform to the contour of the article laterally thereof, said trimming means comprising a central knife member, means providing an oscillating movement of said central knife member relative to the surface of the article, wing knife members having articulated connection with said central knife member, and means for pressing said wing members against the surface of the article.

9. Apparatus for trimming protuberances from an annular tire article, said apparatus comprising means for supporting and rotating the article about its axis, trimming means adjustably mounted to conform to the tread contour of an article supported thereby, trimming means adjustably mounted to conform to the side wall of the tire article and means simultaneously providing an oscillating movement of both said trimming means relative to the surface of the article.

10. Apparatus for trimming protuberances from an annular tire article, said apparatus comprising means for supporting and rotating the article about its axis, trimming means adjustably mounted to conform to the tread contour of an article supported thereby, trimming means adjustably mounted to conform to the side wall of the tire article and means simultaneously providing an oscillating movement of both said trimming means relative to the surface of the article in a direction lateral of the rotative movement of the article.

WALTER J. STRONG.

REFERENCES CITED

The following references are of record in the file of this patent:

UNITED STATES PATENTS

| Number | Name | Date |
|---|---|---|
| 1,609,514 | Kimmerling | Dec. 7, 1926 |
| 1,983,684 | Strong | Dec. 11, 1934 |
| 2,034,662 | McLaughlin et al. | Mar. 17, 1936 |